US005815675A

United States Patent [19]

Steele et al.

[11] Patent Number: 5,815,675

[45] Date of Patent: Sep. 29, 1998

[54] METHOD AND APPARATUS FOR DIRECT ACCESS TO MAIN MEMORY BY AN I/O BUS

[75] Inventors: James C. Steele, Chandler; Barry Davis; Philip Wszolek, both of Phoenix; Brian Fall, Chandler; Swaroop Adusumilli; David Cassetti, both of Tempe; Rodney Pesavento, Chandler; Nick Richardson, Tempe, all of Ariz.

[73] Assignee: VLSI Technology, Inc., San Jose, Calif.

[21] Appl. No.: 670,273

[22] Filed: Jun. 13, 1996

[51] Int. Cl.[6] .................................................... G06F 13/16

[52] U.S. Cl. .......................... 395/293; 395/858; 711/146

[58] Field of Search .................................... 395/306, 308, 395/858, 872, 287, 293; 711/143, 146; 364/240, 242.92, 243.41

[56] References Cited

U.S. PATENT DOCUMENTS

| | | | |
|---|---|---|---|
| 5,255,374 | 10/1993 | Alderegula et al. | 395/325 |
| 5,353,415 | 10/1994 | Wolford et al. | 395/325 |
| 5,355,467 | 10/1994 | MacWilliams et al. | 395/425 |
| 5,440,696 | 8/1995 | Ijitsu et al. | 395/308 |
| 5,463,753 | 10/1995 | Fry et al. | 395/473 |
| 5,499,384 | 3/1996 | Lentz et al. | 395/821 |
| 5,506,971 | 4/1996 | Gullette et al. | 711/146 |
| 5,519,839 | 5/1996 | Culley et al. | 395/310 |
| 5,544,346 | 8/1996 | Amini et al. | 395/481 |
| 5,553,268 | 9/1996 | Willenz et al. | 395/485 |
| 5,572,701 | 11/1996 | Ishida et al. | 395/473 |
| 5,623,635 | 4/1997 | Chen et al. | 395/479 |
| 5,623,700 | 4/1997 | Parks et al. | 395/873 |
| 5,630,094 | 5/1997 | Hayek et al. | 395/473 |
| 5,644,729 | 7/1997 | Amini et al. | 395/250 |
| 5,659,696 | 8/1997 | Amini et al. | 395/412 |

OTHER PUBLICATIONS

PCI Local Bus Specification, Revision 2.1 Production Version, Jun. 1, 1995.

VLSI Technology, Inc. Product Bulletin, Lynx Desktop Solution for 586–Class Processors, 1995.

VLSI Technology, Inc. Product Bulletin, MESA Lynz/Anigma Reference Design, 1995.

VLSI Technology, Inc. Product Bulletin, Lynx/75 Desktop Solution For 75 Mhz, 586–Class Processors, 1996.

Lynx System Controllor Internal Architecture Specification, Document No. 05–VL82C541–02, Revision No. 02, VLSI Technology, Inc., Aug. 11, 1995.

VL82C535 Device (Eagle System Controller) Functional Specification, Document No. 08–000029, Revision *B, VLSI Technology, Inc., Jan. 25, 1996.

Ron Wilson, VLSI launches Lynx set for Pentium, Electronic Engineering Times, Jun. 19,1995, Issue 853.

*Primary Examiner*—Ayaz R. Sheikh
*Assistant Examiner*—Xuan M. Thai
*Attorney, Agent, or Firm*—Hickman & Martine, LLP

[57] ABSTRACT

A computer system in which a host bus is relieved from the burdens of data transfers between main memory and devices connected to an input/output (I/O) bus. Instead, the invention operates to place most of the burden of the data transfer on an internal bus within a bus arbitration unit so that the host bus is freed up much sooner than conventionally achieved. As a result, the computer system has substantially better performance because the host bus is available for other processing operations instead of being tied up with data transfers with devices (e.g., peripheral devices) connected to the I/O bus.

17 Claims, 5 Drawing Sheets

100
CPU 102
CACHE 104
HOST BUS 108
128 130 132 134 135
HOST BUS MASTER 116
120 118
BUS ARBITRATION UNIT 114
MEMORY CNTLR 110
112
MAIN MEMORY 106
124 126
I/O BUS SLAVE 122
136 138
I/O BUS
I/O BUS MASTER 140
146 142 148
PERIPHERAL DEVICE
PERIPHERAL DEVICE 144
150 152

METHOD AND APPARATUS FOR DIRECT ACCESS TO MAIN MEMORY BY AN I/O BUS

CROSS-REFERENCE TO RELATED APPLICATION

This application is related to U.S. patent application Ser. No. 08/664,107, filed concurrently herewith, entitled "METHOD AND APPARATUS FOR ARBITRATING ACCESS TO MAIN MEMORY OF A COMPUTER SYSTEM", naming Steele et al. as inventors, and assigned to the assignee of the present application, and which is hereby incorporated herein by reference for all purposes.

BACKGROUND OF THE INVENTION

1. Field of the Invention

The present invention relates to computer systems, and more particularly, to data transfers between an input/output bus and main memory of a computer system.

2. Description of the Related Art

Conventionally, a personal computer system includes a central processing unit (CPU), a cache memory and a main memory. The CPU, the cache memory and the main memory are interconnected by a host bus which is controlled by a host bus master. Consequently, if the CPU is to transfer data to or from the cache memory, it must do so using the host bus. Likewise, when transferring data to or from the main memory or the cache memory and the CPU, the host bus must also be used.

The conventional personal computer system also includes an input/output (I/O) bus that is controlled by an I/O bus master. Peripheral devices are coupled to the I/O bus. The peripheral devices can issue data requests which request to send data to or receive data from the cache memory or the main memory. However, conventionally, for the I/O bus to transfer the requested data, the host bus master must gain access to the host bus and then utilize the host bus in conjunction with the I/O bus to satisfy the data request by the peripheral device.

One problem with the conventional approach is that to satisfy a data request by a peripheral device, both the I/O bus and the host bus must be tied up while accessing the data in the cache memory or the main memory. As a result, the CPU typically ends up being stalled until the data requested by the peripheral device has been transferred. The stalling of the CPU due to data requests by peripheral devices is a substantial hindrance to the performance of the computer system.

Conventionally, there are two approaches to resolving the contention by the CPU and the peripheral device (I/O bus) for use of the host bus. The first approach puts the CPU into a hold (stop) state to prohibit the CPU from seeking bus cycles on the host bus while the I/O bus has control of the host bus for the data transfer with the peripheral device. This approach gives the I/O bus control over access to the host bus to the exclusion of the CPU. As a result, the CPU cannot interact with either the cache memory or the main memory. The second approach is to limit the length of the data transfer so as to allow the CPU to utilize the host bus periodically during what would otherwise be a long, uninterruptable data transfer. This approach, however, drastically limits the data transfer throughput of the I/O bus and also requires many wasted clock cycles in managing this approach. Hence, the conventional approaches are unsatisfactory solutions to the contention by the CPU and the peripheral device (I/O bus) for use of the host bus.

Thus, there is a need for improved techniques to resolve the contention for usage of the host bus by the CPU and the peripheral device (I/O bus) when both seek to transfer data.

SUMMARY OF THE INVENTION

Broadly speaking, the invention is an improved technique for use in a computer system to free a host bus from the burdens of data transfers between main memory and devices connected to an input/output (I/O) bus. The invention operates to place most of the burden of the data transfer on an internal bus so that the host bus is freed up much sooner than conventionally achieved. As a result, the computer system has substantially better performance because the host bus is available for other processing operations instead of being tied up with data transfers with devices (e.g., peripheral devices) connected to the I/O bus.

The invention can be implemented in numerous ways, including as a system, apparatus or method. Several embodiments of the invention are described below.

As a computer system, an embodiment of the invention includes: a processor for executing instructions of a computer program; a main memory for storing data at addresses within the main memory; a cache memory for storing a plurality of cache lines, each of the cache lines being associated with an address in the main memory; a host bus for providing a first data transmission path; an I/O bus for providing a second data transmission path; a bus arbitration unit, operatively connectable to the main memory, the host bus and the I/O bus, for providing a reconfigurable third data transmission path between the host bus and the main memory and/or between the main memory and the I/O bus; a host bus manager, operatively connected to the bus arbitration unit and the host bus, for controlling the bus arbitration unit to reconfigure the third data transmission path so that data requests from a device coupled to the I/O bus are fulfilled using the second and third data transmission paths while the first transmission path is available for use by the processor; and an I/O bus manager operatively connected to the I/O bus and the host bus manager to detect a data request from the device and forward the data request to the host bus manager.

Preferably, the host bus manager of the computer system issues a cache snoop to the cache memory using the first transmission path of the host bus, and then, in the case of a snoop miss, the bus arbitration unit decouples from the host bus immediately after the cache snoop because the first transmission path is not used in fulfilling the data request, thereby freeing the host bus for use by the processor while the data request is being fulfilled.

As a bus controller for a computer system including a host bus, an I/O bus, a processor, a cache memory and main memory, an embodiment of the invention includes: a host bus manager operatively connected to the host bus; an I/O bus manager operatively connected to the I/O bus and the host bus manager; an internal bus operatively connected to the main memory; a first steering circuit, operatively connected to the host bus manager, for coupling or decoupling the host bus to the internal bus; a storage buffer, operatively connected the I/O bus, for storing data; and a second steering circuit, operatively connected to the I/O bus manager, for coupling or decoupling the internal bus to the storage buffer.

As a method for transferring data from a memory system of a computer system to another device that has requested the data, the invention performs various operations to yield a substantial performance gain to the computer system. The computer system has a processor, a cache memory, a main memory, a host bus, an internal bus, a buffer, an I/O bus and a bus controller. The host bus is coupled to the processor, the cache memory and the internal bus, the internal bus is coupled to the host bus, the main memory and the buffer, and the I/O bus is coupled to the buffer and the device. An embodiment of the invention includes the operations of: receiving a read request from the device, the read request having an address associated therewith; obtaining control of the host bus; snooping the cache memory for the cache line corresponding to the address of the read request; obtaining control of the internal bus; concurrently writing back the cache line from the cache memory to both the main memory and to the buffer using the internal bus and the host bus and thereafter releasing the host bus when the snooping indicates a snoop hit for the cache line; releasing the host bus and thereafter transferring the data requested by the read request from the main memory to the buffer using the internal bus when the snooping indicates a snoop miss for the cache line; and transferring the data held in the buffer from the buffer to the device via the I/O bus. By releasing the host bus early, the invention enables the processor to control and utilize the host bus during much of the read request.

As a method for transferring data from a memory system of a computer system to another device that has requested the data, the invention performs various operations to yield a substantial performance gain to the computer system. The computer system has a processor, a cache memory, a main memory, a host bus, an internal bus, a buffer, an I/O bus and a bus controller. The host bus is coupled to the processor, the cache memory and the internal bus, the internal bus is coupled to the host bus, the main memory and the buffer, and the I/O bus is coupled to the buffer and the device. An embodiment of the invention includes the operations of: receiving a write request from the device, the write request having an address associated therewith; transferring write data associated with the write request from the device to the buffer via the I/O bus; obtaining control of the host bus; snooping the cache memory for the cache line for the address of the write request; obtaining control of the internal bus; writing back the cache line from the cache memory to the main memory and thereafter releasing the host bus when the snooping indicates a snoop hit for the cache line; releasing the host bus following the snooping when the snooping indicates a snoop miss and following the writing back when the snooping indicates a snoop hit; and transferring, after the releasing, the data of the write request to the main memory from the buffer using the internal bus.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–5. However, those skilled in the art will readily appreciate that the detailed description given herein with respect to these figures is for explanatory purposes as the invention extends beyond these limited embodiments.

The invention pertains to a computer system in which a host bus is relieved from the burdens of data transfers between main memory and devices connected to an input/output (I/O) bus. Instead, the invention operates to place most of the burden of the data transfer on an internal bus within a bus arbitration unit so that the host bus is freed up much sooner than conventionally achieved. As a result, the computer system has substantially better performance because the host bus is available for other processing operations instead of being tied up with data transfers with devices (e.g., peripheral devices) connected to the I/O bus.

Figure 1:
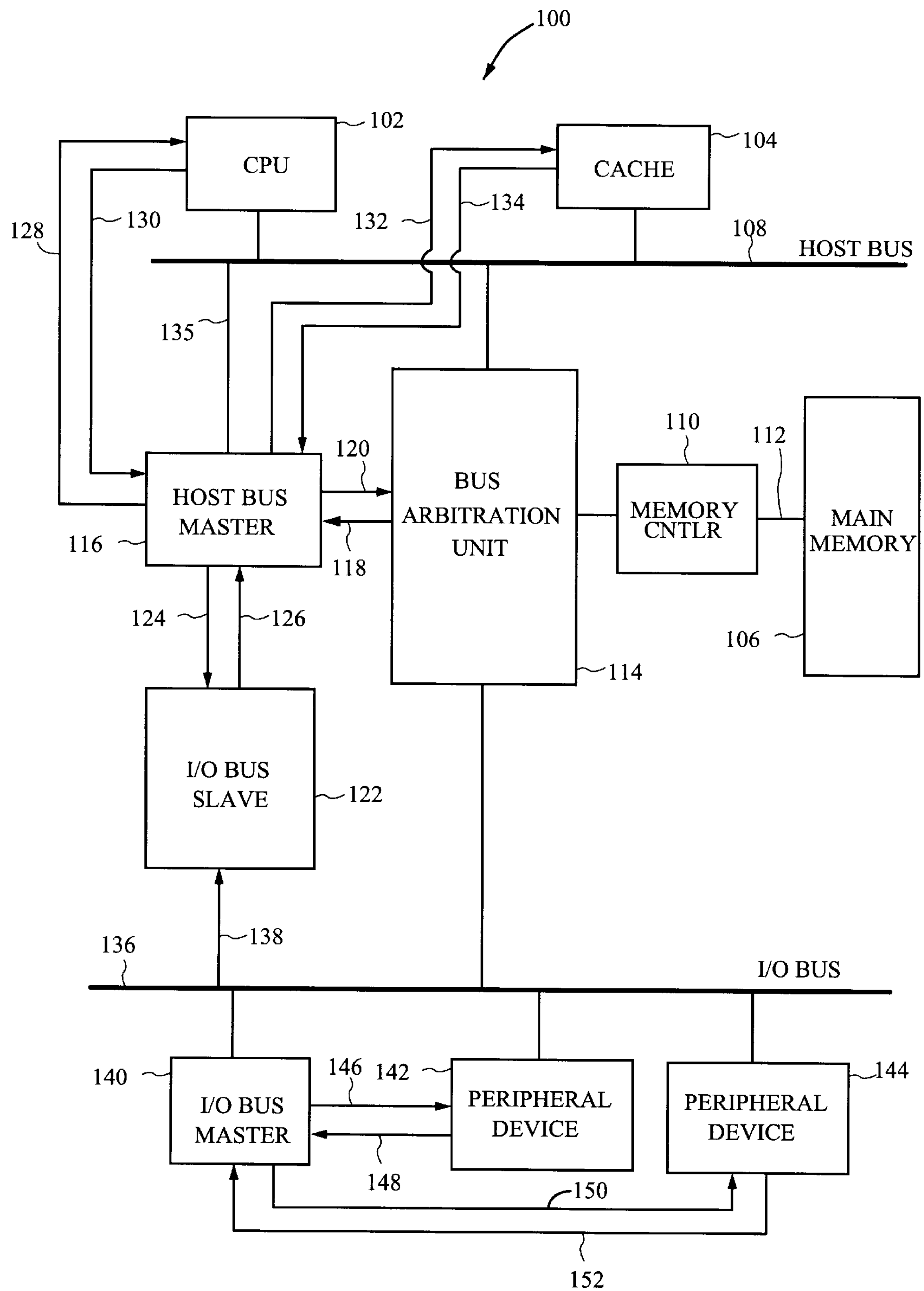
FIG. 1 is a block diagram of a computer system according to an embodiment of the invention.

FIG. 1 is a block diagram of a computer system 100 according to an embodiment of the invention. The computer system 100 includes a central processing unit (CPU) 102, a cache memory 104 and a main memory 106. The CPU 102 and the cache memory 104 are both coupled to the host bus 108. As is conventional, the CPU 102 executes instructions of computer programs, and the cache memory 104 and the main memory 106 store data. The main memory 106 and the cache memory 104 are preferably implemented by static random-access memory (SRAM) or dynamic random-access memory (DRAM), but other types of data storage for electrical signals could also be used. The main memory 106 is substantially larger than the cache memory 104. The data access time for the cache memory 104 is also normally faster than it is for the main memory 106. Cache memories are well known and operate with several different policies. In the exemplary embodiment of the invention discussed below, the cache memory 104 operates as a write back cache, though other cache policies could be used. The cache memory 104 is also illustrated in FIG. 1 as a cache memory that is separate from the CPU 102 but coupled thereto via the host bus 108. However, the cache memory 104 can also be integral with the CPU 102. The cache memory 104 could also have multiple levels, for example, an on-board level-1 cache that is integral with the CPU 102 and a separate level-2 cache that is coupled to the CPU 102 via the host bus 108. For much of the discussion below, it is assumed that cache memory 104 has a single level that is coupled to the CPU 102 via the host bus 108.

The computer system 100 also includes a memory controller 110, a data bus 112, a bus arbitration unit 114 and a host bus master 116. The memory controller 110 operates in a conventional manner to control the storage and retrieval of data from the main memory 106. The data bus 112 couples the memory controller 110 to the main memory 106. Data is passed to and from the main memory 106 by way of the memory controller 110 and the data bus 112. The bus arbitration unit 114 sends and receives control signals 118 and 120 to the host bus master 116.

The host bus master 116 controls operations on the host bus 108. The host bus master 116 is coupled to an I/O bus slave 122. The host bus master 116 sends and receives control signals 124 and 126 to and from the 1/O bus slave 122. Additionally, the host bus master 116 sends and receives control signals 128 and 130 to and from the CPU 102, and sends and receives control signals 132 and 134 to and from the cache memory 104. In addition, a link 135 couples the host bus master 116 to the host bus 108. The link 135 is used to send and receive control signals (e.g., snoop request) over the host bus 108. Depending on the implementation, any of the control signals 118, 120 and 128–134 can be part of the link 135 or be separated therefrom.

The computer system 100 further includes an I/O bus 136, a link 138, an I/O bus master 140, and peripheral devices 142 and 144 (or I/O devices). The I/O bus master 140 and the peripheral devices 142 and 144 are coupled to the I/O bus 136. The peripheral devices 142 and 144 send and receive control signals 146–152 to and from the I/O bus master 140. Examples of the peripheral devices include printers, video boards, tape drives, modems, PC-CARDS, etc. When one of the peripheral devices 142 and 144 issues a data request via the control signals 148 and 153, the I/O bus master 140 forwards the data request to the I/O bus slave 122 using the link 138. Then, the I/O bus slave 122 notifies the host bus master 116 that the data transfer request requires use of the host bus 108 at this time. The host bus master 116 then uses the control signals 128 and 130 as well as the control signals 132 and 134 (or other control signals supplied over the link 135) to disconnect the CPU 102 and the cache memory 104 from the host bus 108. The host bus master 116 also uses the control signals 118 and 120 to cause the bus arbitration unit 114 to grab (couple to) the host bus 108. Once the host bus 108 is coupled to the bus arbitration unit 114, the host bus master 116 causes a cache snoop to occur to the cache memory 104 in accordance with the cache line associated with the data transfer request. Once the cache snoop is completed the host bus 108 can be released (decoupled) so that the CPU 102 can make use of the host bus 108 while the transfer of data between the main memory 106 and a peripheral device via the I/O bus 136. The invention thus enables concurrent, yet separate, usage of the host bus 108 and I/O bus 136. In the case in which the cache snoop indicates a cache hit to a dirty cache line, in the exemplary implementation, the dirty cache line from the cache memory 104 is written back to the main memory 106 before the data transfer request is performed. This ensures coherency between the cache memory 104 and the memory 106. The write back operation does, however, require use of the host bus 108 to write the data from the dirty cache line of the cache memory 104 to the main memory 106. When the data transfer request is a read request, the write back preferably writes to the bus arbitration unit 114 for the peripheral device at the same time. Using different cache policies and/or multiple levels of cache memory, memory coherency can be managed differently. Additional details on the operation of the bus arbitration unit 114 and the host bus master 120 in accordance with the present invention are explained in detail below with respect to FIGS. 4 and 5.

Figure 2:
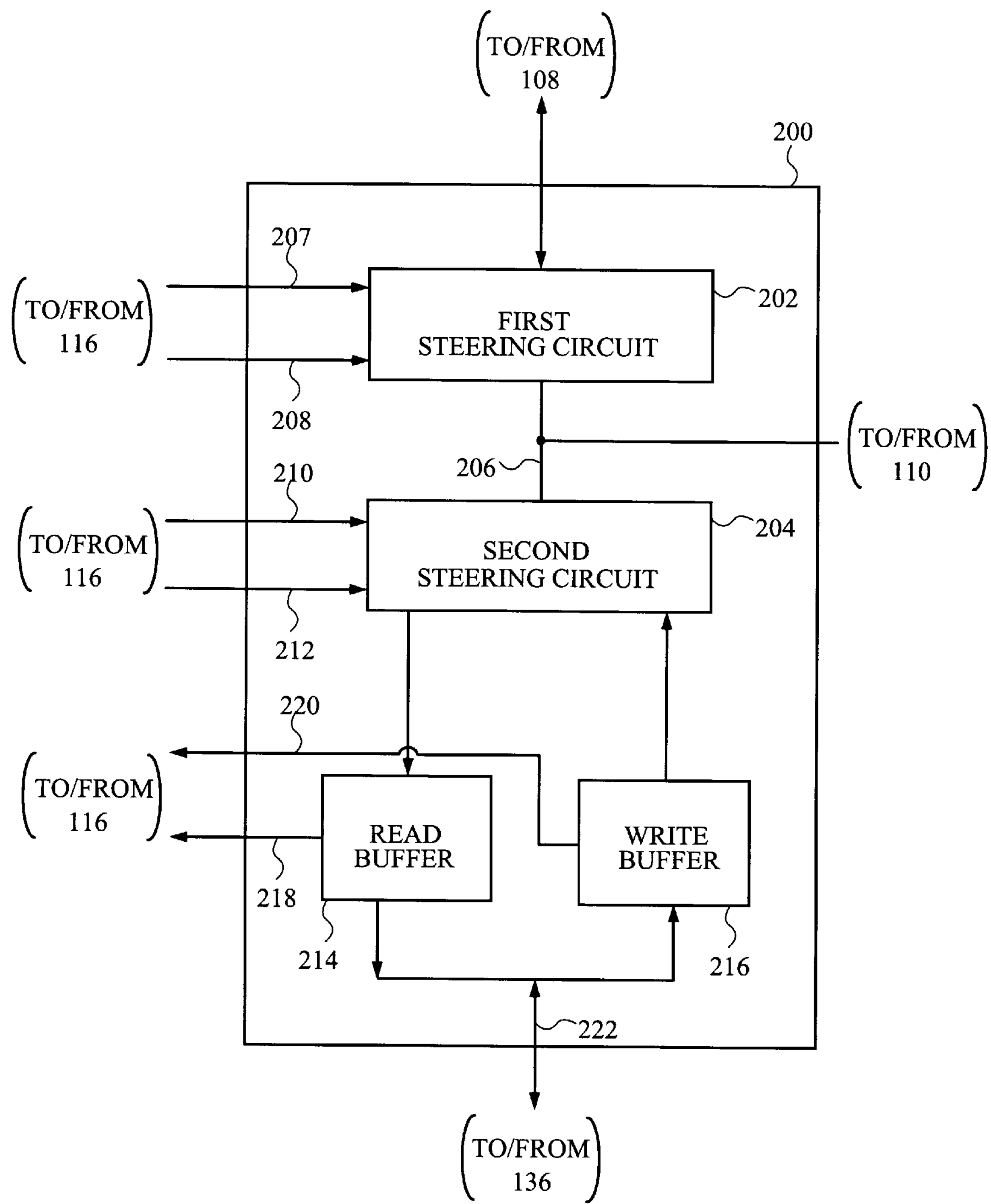
FIG. 2 is a block diagram of a bus arbitration unit according to an embodiment of the invention.

FIG. 2 is a block diagram of a bus arbitration unit 200 according to an embodiment of the invention. The bus arbitration unit 200 is a preferred implementation for the bus arbitration unit 114 illustrated in FIG. 1.

The bus arbitration unit 200 is coupled to the host bus 108, the I/O bus 136, the memory controller 110 and the host bus master 116. The bus arbitration unit 200 includes a first steering circuit 202 and a second steering circuit 204. The first and second steering circuits 202 and 204 are interconnected by an internal bus 206. The internal bus 206 also couples to the main memory 106 via the memory controller 110. The first steering circuit 202 receives control signals 207 and 208 from the host bus master 116. The second steering circuit 204 receives control signals 210 and 212 from the host bus master 116. The control signals 207–212 are included within the control signals 118 and 120 in FIG. 1. These control signals 207–212 control the first and second steering circuits 202 and 204 to determine the direction in which data can flow if at all. Namely, based on the control signals, the first and steering circuits 202 and 204 are individually controllable and can operate to (i) supply data to the internal bus 206, (ii) receive data from the internal bus 206, or (iii) isolate the internal bus 206. The bus arbitration unit 200 further includes a read buffer 214 and a write buffer 216. The read buffer 214 and the write buffer 216 provide temporary storage for data associated with a data request. The read buffer 214 provides a fill level indicator 218 to the host bus master 116, and the write buffer 216 provides a fill level indicator 220 to host bus master 116. The input to the read buffer is provided by the second steering circuit 204. The output of the read buffer 214 is then forwarded to the I/O bus 136 via a link 222. The input to the write buffer 216 is provided by the I/O bus 136 via the link 222, and the output of the write buffer 216 is forwarded to the second steering circuit 204.

Figure 3:
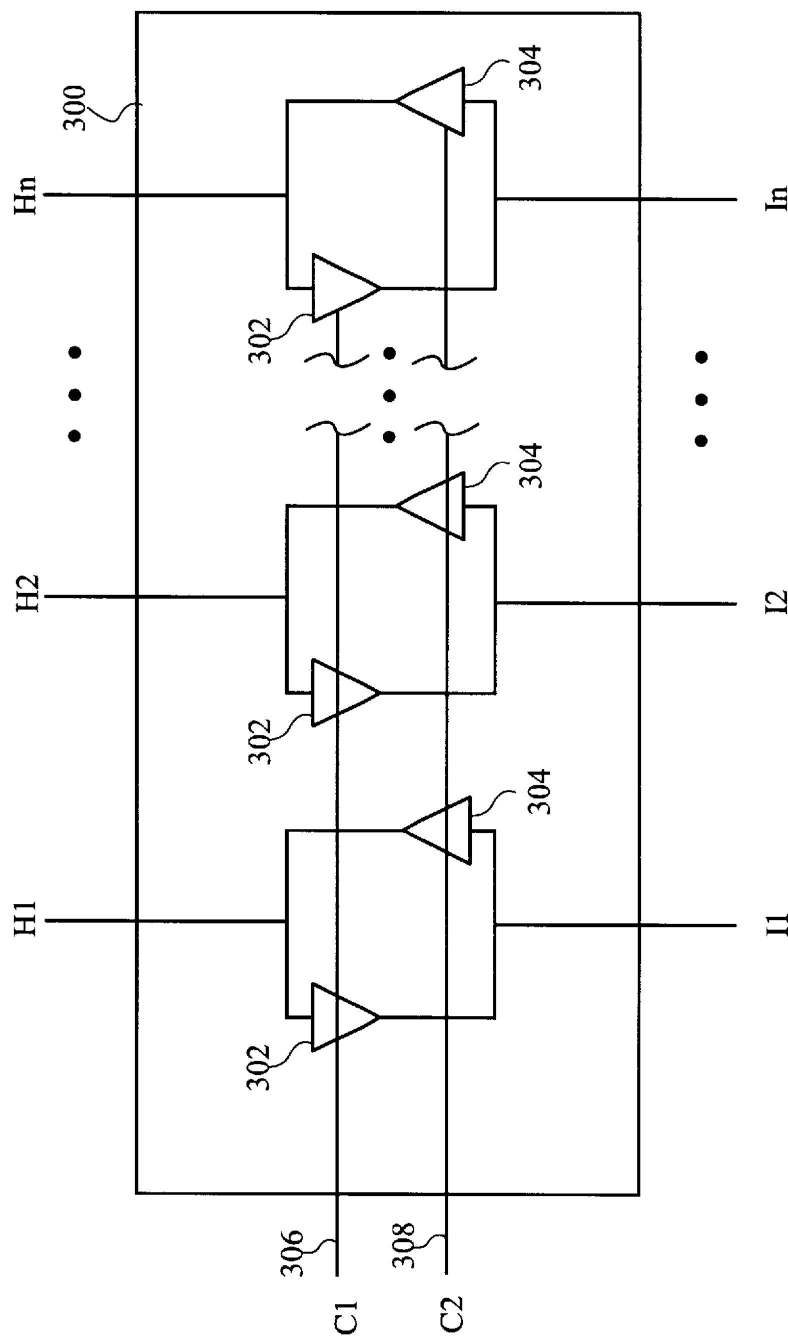
FIG. 3 is a schematic diagram of a steering circuit according to an embodiment of the invention.

FIG. 3 is a schematic diagram of a steering circuit 300 according to an embodiment of the invention. The steering circuit 300 is a preferred implementation for the first steering circuit 202 illustrated in FIG. 2. The second steering circuit 204 illustrated in FIG. 2 would have a similar design.

The steering circuit 300 is coupled to a bus having n lines. Namely, the steering circuit 300 is interposed between a first bus having lines H1, H2, . . . , Hn and a second bus having lines I1, I2, . . . , In. For each respective pair of bus lines, there is a pair of tri-state buffers 302 and 304 included within the steering circuit 300. The buffers 302 within the steering circuit 300 are controlled by a control line C1 306, and the buffers 304 within the steering circuit 300 are controlled by a control line C2 308. For this embodiment, assume that the buffers 302 and 304 are active on a high signal on the control lines C1 and C2, respectively, and that the buffers 302 and 304 are inactive on a low signal on the control lines C1 and C2, respectively. For example, if the control line C1 306 is high and the control line C2 308 is low, then the buffers 302 are activated and the buffers 304 are deactivated, and the data can pass through the steering circuit 300 from the bus lines H1, H2, . . . , Hn to the bus lines I1, I2, . . . , In, respectively. If, on the other hand, the control line C2 308 is high and the control line C1 306 is low, then the buffers 304 are activated and the buffers 302 are deactivated, and the data can pass through the steering circuit 300 from the bus lines I1, I2, . . . , In to the bus lines H1, H2, . . . , Hn, respectively. When both the control lines C1 and C2 are both low, then no data passes through the steering circuit 300 as the bus lines of the respective buses are isolated from one another. The control lines C1 304 and C2 308 cannot both be high at the same time. For the second steering circuit 204, the outputs of the buffers 302 and the inputs of the buffers 304 are not coupled together.

Figure 4:
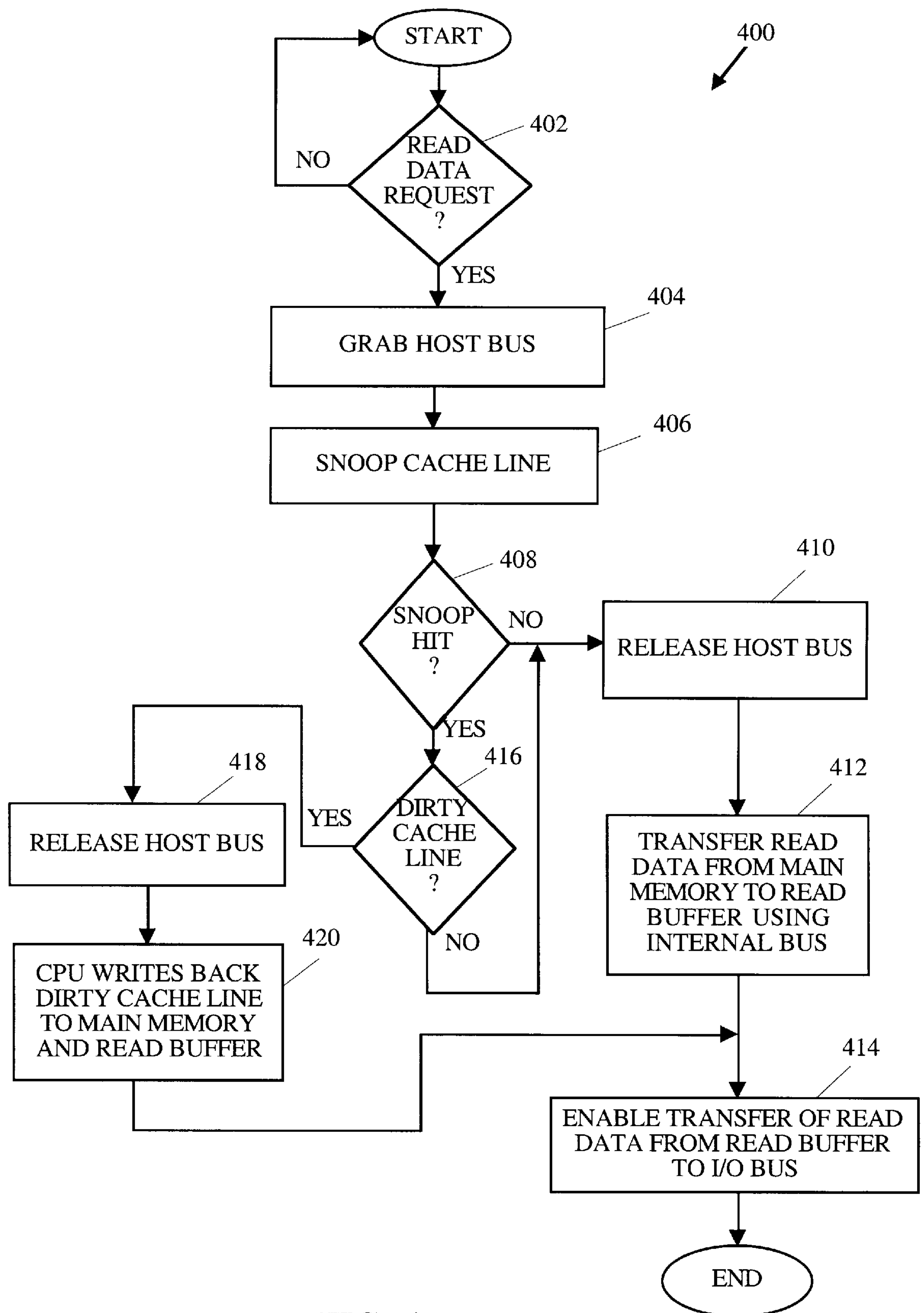
FIG. 4 is a flow diagram of read request processing according to an embodiment of the invention.

FIG. 4 is a flow diagram of read request processing 400 according to an embodiment of the invention. The read request processing 400 is described with respect to the computer system 100 illustrated in FIG. 1 and the bus arbitration unit 200 illustrated in FIG. 2. The read request processing 400 is preferably carried out by the host bus master 120.

The read request processing 400 begins with a decision block 402 that determines whether a read data request is present from a peripheral device coupled to the I/O bus 136. If a read data request is determined not to be present, the read request processing 400 awaits such a request. Once a read data request is determined to be present, the read request processing 400 grabs 404 (takes control of) the host bus 108. After the host bus 108 is grabbed 404, the cache line associated with the read request is snooped 406. Then, a decision 408 determines whether a snoop hit has occurred. In the exemplary embodiment, the host bus master 116 grabs 404 the host bus 108 and snoops 406 the cache line, and then the host bus master 116 and comparison logic of the cache memory 104 determine whether the cache memory 104 currently holds the cache line associated with the read request. Note, however, that the comparison logic of the cache memory 104 can reside in the bus arbitration unit 114.

If the decision 408 determines that the snoop hit has not occurred (i.e., snoop miss), then the host bus 108 is released 410. After releasing the host bus 108, the read data is transferred 412 from the main memory to the read buffer 214 using the internal bus 206. The second steering circuit 204 is also configured by the control signals 210 and 212 to pass data from the internal bus 206 to the read buffer 214, and the first steering circuit 202 provides isolation. Then, the transfer 412 of the read data is achieved directly from the main memory 106 to the read buffer 214 via the internal bus 206. In this situation, the CPU 102 is able to use the host bus 108 as soon as it is released 410 by the host bus master 120. Consequently, it is possible that the transfer 412 of the read data needed to fulfill the read data request of the peripheral device can occur using the internal bus 206 while, at the same time, the CPU 102 is making use of the host bus 108 to carry out its operations. This results in a substantial performance improvement as compared to conventional approaches. Of course, the CPU 102 could not also make use of the main memory 106 while the transferring 412 of data for the read data request is occurring. In any case, following block 412, the transfer of the read data from the read buffer 214 to the I/O bus 136 is enabled 414 so that the I/O bus 136 can forward the requested data from the read buffer 214 in the bus arbitration unit 114, 200 to the particular peripheral device that has requested the data. In the exemplary implementation, this enablement 414 of the transfer can begin as soon as a portion of the requested data is stored to the read buffer. Because the speed of the I/O bus 136 will be slower than the speed of the host bus 108 or the internal bus 206, the I/O bus 136 can begin streaming data out from the read buffer 214 as soon as a portion becomes ready. Following block 414, the read request processing 400 is complete and ends.

On the other hand, when the decision block 408 determines that a snoop hit has occurred, a decision 416 determines whether the cache line associated with the snoop hit is dirty. A dirty cache line means that the cache line has been modified since being read in from main memory. If the cache line is not dirty (i.e., clean), then the read request processing 400 performs blocks 410, 412 and 414 to transfer the data directly from the main memory 106 to the read buffer 214, and then to the I/O bus 136 in route to the peripheral device. If, on the other hand, the cache line is dirty, the host bus 108 is released 418, and then the CPU 102 writes back 420 the dirty cache line to the main memory 106 as well as to the read buffer 214. In other words, the CPU 102 writes back the dirty cache line to both the main memory 106 and the read buffer 214 at the same time. This is achieved by the cache memory placing the data associated with the dirty cache line on the host bus 108, using the first steering circuit 202 to direct data from the host bus 108 to the internal bus 206, using the memory controller 110 to couple the internal bus 206 to the data bus 112 for the main memory 106, and using the second steering circuit 204 to direct data from the internal bus 206 to the read buffer 214. Following block 420, the read request processing 400 performs block 414 as discussed above to enable the transfer of the data from the read buffer 214 to the I/O bus 136 in route to the peripheral device.

In the exemplary embodiment, the read request processing 400 ends after block 414. However, in other implementations read requests might span multiple cache lines in which case the read request processing 400 would snoop the cache line.

Figure 5:
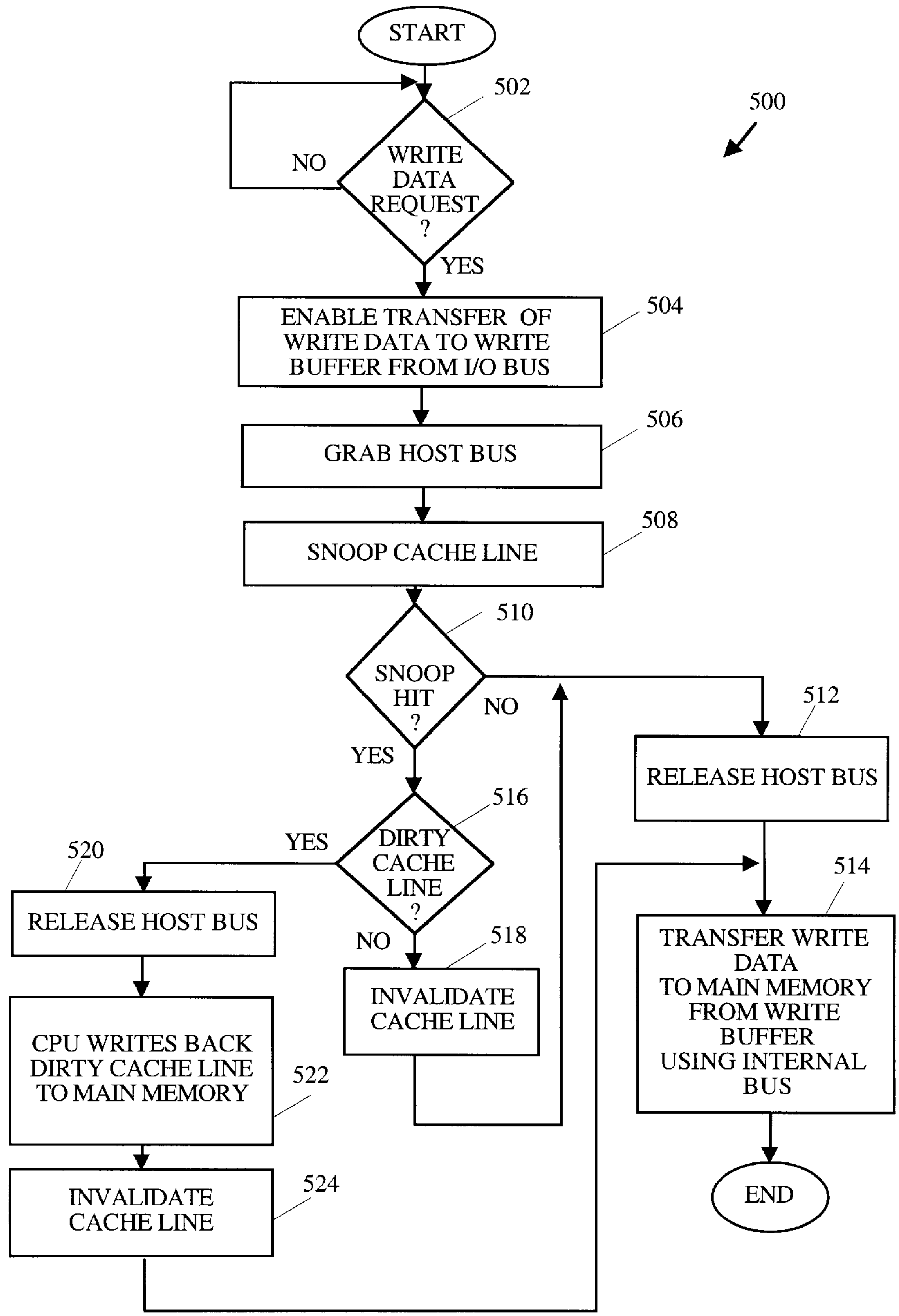
FIG. 5 is a flow diagram of write request processing according to an embodiment of the invention.

FIG. 5 is a flow diagram of write request processing 500 according to an embodiment of the invention. The write request processing 500 is described with respect to the computer system 100 illustrated in FIG. 1 and the bus arbitration unit 200 illustrated in FIG. 2.

The write request processing 500 begins with a decision 502 that determines whether a write data request has been issued by a peripheral device coupled to the I/O bus 136. If no write data request has been issued, the decision block 502 causes the write request processing 500 to await such a write data request. Once a write data request has been issued, the write request processing 500 proceeds.

After a write request is issued, the transfer of the write data to the write buffer 216 from the I/O bus 136 is enabled 504. This transferring occurs at the speed of the I/O bus 136 under the control of the I/O bus master 140. Once the write request is issued, the transferring can begin and continue until the write buffer 216 becomes full or all the write data has been transferred. While this transferring is occurring, other data transfer operations can be performed.

After enabling 504 the transfer of the write data to the write buffer 216, the host bus 108 is grabbed 506. In the preferred implementation, the host bus master 116 grabs 506 the host bus 108. Next, the cache line associated with the write data request is snooped 508. A decision 510 then determines whether a snoop hit has occurred. In the exemplary embodiment, the host bus master 116 grabs 506 the host bus 108 and snoops 508 the cache line, and then the host bus master 116 and comparison logic of the cache memory 104 determine whether the cache memory 104 currently holds the cache line associated with the read request. Note, however, that the comparison logic of the cache memory 104 can reside in the bus arbitration unit 114.

If the decision block 510 determines that a snoop hit has not occurred (i.e., a snoop miss), the host bus 108 is released 512. Then, the write data is transferred 514 to main memory 106 from the write buffer 216 using the internal bus 206. Here, the write data is stored to the main memory 106 without having to use the host bus 108, so that at the same time, the CPU 102 is able to use the host bus 108 to perform its operations, thus yielding a substantial performance increase over conventional approaches to accessing memory via the I/O bus 136. Following, block 514, the write request processing 500 is complete and ends.

On the other hand, when the decision block 510 determines that a snoop hit has occurred, a decision 516 determines whether the cache line associated with the write data request is dirty. If the cache line is not dirty (i.e., clean), then the cache line is invalidated 518 and then previously described blocks 512 and 514 are carried out. In the exemplary embodiment, the cache line is invalidated 518 because the data of the write data request is being written directly to the main memory 106 and once this is achieved, the cache line would be invalid because it no longer corresponds to the contents of the main memory 106.

Alternatively, when the decision block 510 determines that a snoop hit has occurred and that the decision block 516 determines that the cache line is dirty, then the host bus 108 is released 520. The CPU 102 also writes back 522 the dirty cache line to the main memory 106, and invalidates 524 the cache line. These operations occur in the exemplary embodiment because the write data request is written directly to the main memory 106, and that the data being written to the main memory 106 may not modify all the bytes within the cache line. For example, in a Pentium® type computer system, following a snoop to a cache line, the cache line is automatically written back to the main memory 106. Here, in the exemplary embodiment, the write back is also done, but the host bus 108 is acquired by the CPU 102 for the write back operation and then released as soon as the write back is complete. The write back 522 ensures that the contents of the main memory 106 following the write request processing 500 will contain the accurate values of the byte or the cache line. The invalidation 524 of the cache line is needed because after the completion of the write data request the cache line would be invalid because it no longer corresponds to the contents of the main memory 106. Following block 524, the previously described block 514 is carried out to transfer 514 the write data to the main memory 106 from the write buffer 216 using the internal bus 206. Here, the write data is stored to the main memory 106 without having to use the host bus 108, so that at the same time, the CPU 102 is able to use the host bus 108 to perform its operations, thus yielding a substantial performance increase over conventional approaches to accessing memory via the I/O bus 136. Again, following block 514, the write request processing 500 is complete and ends.

In the case in which the cache memory 104 of the computer system 100 has an on-board level-1 cache that is integral with the CPU 102 and a separate level-2 cache that is coupled to the CPU 102 via the host bus 108, the cache coherency management is performed slightly different. The cache snoop is to both the level-1 cache and the level-2 cache. For sake of discussion, it is assumed that the level-1 cache performs the automatic write back after a snoop but that the level-2 cache does not perform automatic write back and lacks valid indicators. Hence, the host bus master 116 is used to manage the coherency of the level-2 cache. Namely, one approach to manage a level-2 cache is as follows, but those in the art should recognize that many other approaches can be used.

With a read data request, when there is a cache miss in the level-1 cache and a cache hit in the level-2 cache, then the host bus master 116 reads the cache line from the level-2 cache using the host bus 108 and the steering circuits 202 and 204 within the bus arbitration unit 114 direct the data to the main memory 106 and the read buffer 214. On the other hand, if there is a cache hit at both levels and the cache line in level-1 is dirty, then the automatic write back to the main memory 106

With a write request, when there is a cache miss in the level-1 cache and a cache hit in the level-2 cache, then the host bus master 116 writes the data of the write data request to the cache line from the write buffer 216 to the level-2 cache using the host bus 108 and the steering circuits 202 and 204 within the bus arbitration unit 114. On the other hand, if there is a cache hit at both levels and the cache line in level-1 is dirty, then the automatic write back is performed for the dirty cache line in the level-1 cache to the level-2 cache using the host bus 108, and then the data of the write data request is written from the write buffer 216 to the cache line in the level-2 cache using the host bus 108 and the steering circuits 202 and 204 within the bus arbitration unit 114.

It should be noted that the invention improves performance of a computer system by making a host bus more available for a processor's usage during data requests from peripheral devices coupled to an I/O bus. A cache memory is part of the computer system but is not directly used to achieve the performance advantage of the invention. Cache memories are well known and operate with several different policies. Hence, the above discussion of cache memories used in the computer system are only representative though perhaps preferred for the exemplary implementation.

Attached hereto as "Appendix A" is the Lynx System Controller Internal Architecture Specification which describes various features, details and operating characteristics of the present invention, and which forms a part of this patent specification.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer system comprising:

a processor for executing instructions of a computer program;

a main memory for storing data at addresses within said main memory;

a cache memory for storing a plurality of cache lines, each of the cache lines being associated with an address in said main memory;

a host bus for providing a first data transmission path;

an I/O bus for providing a second data transmission path;

a bus arbitration unit, operatively connectable to said main memory, said host bus and said I/O bus, for providing a reconfigurable third data transmission path between said host bus and said main memory and/or between said main memory and said I/O bus and/or between said I/O bus and said host bus, said reconfigurable third data transmission path being established between a first steering circuit and a second steering circuit, the first steering circuit being coupled to the second steering circuit via an internal bus that also connects to said main memory;

a host bus manager, operatively connected to said bus arbitration unit and said host bus, for controlling said bus arbitration unit to reconfigure the third data transmission path so that data requests from a device coupled to said I/O bus are fulfilled using the second and third data transmission paths while the first transmission path is available for use by said processor; and wherein said host bus manager issues a cache snoop to said cache memory using the first transmission path and an I/O bus manager operatively connected to the I/O bus and said host bus manager to detect a data request from the device and forward the data request to said host bus manager, wherein, in the case of a snoop miss, said bus arbitration unit decouples from said host bus immediately after the cache snoop because the first transmission path is not used in fulfilling the data request, thereby freeing said host bus for use by said processor while the data request is being fulfilled.

2. A computer system as recited in claim 1, wherein, in the case of a snoop hit, a memory block is written back to said main memory using the first transmission path of said host bus and the third data transmission path, and thereafter said bus arbitration unit decouples from said host bus by reconfiguring the third data transmission path.

3. A computer system as recited in claim 2, wherein, in the case of a snoop hit, said bus arbitration unit provides the reconfigurable third data transmission path between both said host bus and said I/O bus as well as said main memory while the memory block is being written back, but afterwards said bus arbitration unit decouples from said host bus.

4. A computer system as recited in claim 1, wherein said first steering circuit is capable of coupling or decoupling said host bus to said internal bus.

5. A computer system as recited in claim 4, further comprising:

a buffer storage device that includes a read buffer and a write buffer, the buffer storage device being connected to said I/O bus for temporarily storing data associated with the data request.

6. A computer system as recited in claim 5, wherein said second steering circuit is capable of coupling or decoupling said internal bus to said buffer storage device.

7. A bus controller for a computer system, the computer system including a host bus, an I/O bus, a processor, a cache memory and main memory, said bus controller comprising:

a host bus manager operatively connected to said host bus;

an I/O bus manager operatively connected to the I/O bus and said host bus manager;

an internal bus operatively connected to the main memory;

a first steering circuit, operatively connected to said host bus manager, for coupling or decoupling the host bus to said internal bus;

a storage buffer, operatively connected to the I/O bus, for storing data; and a second steering circuit, operatively connected to said host bus manager, for coupling or decoupling said internal bus to said storage buffer, said internal bus is connected between said first steering circuit and said second steering circuit;

wherein in response to a data request, said host bus manager couples the host bus to said first steering circuit and then issue a snoop request for an address associated with the data request to the cache memory, wherein said host bus manager promptly causes said first steering circuit to decouple from the host bus when the snoop request indicates a snoop miss or a snoop hit to a clean cache line.

8. A bus controller for a computer system, the computer system including a host bus, an I/O bus, a processor, a cache memory and main memory, said bus controller comprising:

a host bus manager operatively connected to said host bus;

an I/O bus manager operatively connected to the I/O bus and said host bus manager;

an internal bus operatively connected to the main memory;

a first steering circuit, operatively connected to said host bus manager, for coupling or decoupling the host bus to said internal bus;

a storage buffer, operatively connected to the I/O bus, for storing data; and a second steering circuit, operatively connected to said host bus manager, for coupling or decoupling said internal bus to said storage buffer, said internal bus is connected between said first steering circuit and said second steering circuit;

wherein a peripheral device is coupled to the I/O bus, and the peripheral device issues a data request, wherein said I/O bus manager detects the data request from the peripheral device via the I/O bus and informs said host bus manager of the data request, and wherein said host bus manager takes control of said host bus, issues a snoop request to the cache memory, and thereafter determines when to release control of the host bus based on the result of the snoop request.

9. A bus controller as recited in claim 8, wherein a plurality of peripheral devices are coupled to the I/O bus, each of the peripheral devices being capable of issuing the data request, wherein, when the snoop request indicates a snoop miss or a snoop hit to a clean cache line, said host bus manager immediately causes said first steering circuit to decouple from the host bus and said second steering circuit to couple said internal bus to said storage buffer, and wherein, when the snoop request indicates a snoop hit to a dirty cache line, said host bus manager causes said first steering circuit to couple the host bus to said internal bus, the dirty cache line is then caused to be written back to the main memory via the host bus and said internal bus, thereafter said host bus manager promptly causes said first steering circuit to decouple from the host bus.

10. A method for transferring data from a memory system of a computer system to another device that has requested the data, the computer system includes a processor, a cache memory, a main memory, a host bus, an internal bus that is coupled between a first steering circuit and a second steering circuit, a buffer, an I/O bus and a bus controller, the host bus is coupled to the processor, the cache memory and the internal bus, the internal bus is coupled to the host bus via said first steering circuit, the main memory, and the buffer via said second steering circuits and the I/O bus is coupled to the buffer and the device, said method comprising:

(a) receiving a read request from the device, the read request having an address associated therewith;

(b) obtaining control of the host bus;

(c) snooping the cache memory for the cache line corresponding to the address of the read request;

(d) concurrently writing back the cache line from the cache memory to both the main memory and to the buffer using the internal bus and the host bus, and then releasing the host bus, when said snooping (c) indicates a snoop hit for the cache line;

(e) releasing the host bus, and then transferring the data requested by the read request from the main memory to the buffer using the internal bus, when said snooping (c) indicates a snoop miss for the cache line; and (f) transferring the data held in the buffer from the buffer to the device via the I/O bus, wherein said releasing (e) of the host bus enables the processor to use the host bus for other data transfer operations with the cache memory concurrently with said transferring (e) and (f).

11. A method as recited in claim 10, wherein said transferring (e) comprises:

obtaining control of the internal bus;

transferring the data requested by the read request from the main memory to the buffer using the internal bus; and thereafter releasing the internal bus.

12. A method as recited in claim 11, wherein said writing back (d) comprises:

obtaining control of the internal bus;

writing back the cache line from the cache memory to both the main memory and to the buffer using the internal bus and the host bus; and thereafter releasing the internal bus after the cache line has been written back.

13. A method as recited in claim 10, wherein the buffer is a read buffer.

14. A method for transferring data to a memory system of a computer system from another device that has requested that the data be transferred, the computer system includes a processor, a cache memory, a main memory, a host bus, an internal bus that is coupled between a first steering circuit ad a second steering circuit, a buffer, an I/O bus and a bus controller, the host bus is coupled to the processor, the cache memory and the internal bus, the internal bus is coupled to the host bus via said first steering circuit, the main memory, and the buffer via said second steering circuit, and the I/O bus is coupled to the buffer and the device, said method comprising:

(a) receiving a write request from the device, the write request having an address associated therewith;

(b) transferring write data associated with the write request from the device to the buffer via the I/O bus;

(c) obtaining control of the host bus;

(d) snooping the cache memory for the cache line for the address of the write request;

(e) writing back the cache line from the cache memory to the main memory and then releasing the host bus when said snooping (d) indicates a snoop hit for the cache line;

(f) releasing the host bus following said snooping (d) when said snooping (d) indicates a snoop miss and following said writing back (e) when said snooping (d) indicates a snoop hit;

(g) transferring, after said releasing (f), the data of the write request to the main memory from the buffer using the internal bus, (h) releasing the internal bus after said transferring (g) completes the transfer of the data of the write request to the main memory.

15. A method as recited in claim 14, wherein said releasing (f) of the host bus enables the processor to control and utilize the host bus during said transferring (g).

16. A method as recited in claim 14, wherein said releasing (f) of the host bus enables the processor to use the host bus for other data transfer operations with the cache memory concurrently with said transferring (g).

17. A method as recited in claim 14, wherein the buffer is a write buffer.

* * * * *